United States Patent
Wu et al.

(10) Patent No.: US 12,367,271 B2
(45) Date of Patent: Jul. 22, 2025

(54) WEARABLE DEVICE AND CONTROL METHOD THEREOF

(71) Applicant: HTC Corporation, Taoyuan (TW)

(72) Inventors: Chun-Yih Wu, Taoyuan (TW);
Ta-Chun Pu, Taoyuan (TW);
Yen-Liang Kuo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 140 days.

(21) Appl. No.: 18/509,877

(22) Filed: Nov. 15, 2023

(65) Prior Publication Data

US 2025/0131077 A1  Apr. 24, 2025

(30) Foreign Application Priority Data

Oct. 20, 2023 (TW) ................. 112140117

(51) Int. Cl.
*G06F 21/00* (2013.01)
*G06F 21/32* (2013.01)
*G06F 1/16* (2006.01)

(52) U.S. Cl.
CPC .............. *G06F 21/32* (2013.01); *G06F 1/163* (2013.01)

(58) Field of Classification Search
CPC ................. G06F 21/32; G06F 1/163
See application file for complete search history.

(56) References Cited

U.S. PATENT DOCUMENTS

| | | | |
|---|---|---|---|
| 2018/0375660 A1* | 12/2018 | Yildiz | H04W 4/80 |
| 2020/0250284 A1* | 8/2020 | Diehl | G06F 3/013 |
| 2022/0357766 A1* | 11/2022 | Karkera | G02B 27/017 |

FOREIGN PATENT DOCUMENTS

| | | |
|---|---|---|
| CN | 106603107 A | 4/2017 |
| CN | 109960914 A | 7/2019 |
| CN | 111984945 A | 11/2020 |
| CN | 114610193 A | 6/2022 |
| TW | 202328887 A | 7/2023 |

\* cited by examiner

*Primary Examiner* — William A Corum, Jr.
(74) *Attorney, Agent, or Firm* — Birch, Stewart, Kolasch & Birch, LLP

(57) ABSTRACT

A wearable device interacting with a computing device includes a fingerprint identification module, a pressure sense module, a verification chip, and a processor. The fingerprint identification module receives a fingerprint signal. The fingerprint identification module performs a first verification process on the fingerprint signal. The pressure sense module receives a touch signal. The pressure sense module generates a pending signal according to the touch signal. The verification chip performs a second verification process on the pending signal. The processor is coupled to the fingerprint identification module and the verification chip. The processor is selectively operated in a locked mode or an unlocked mode. If both the first verification process and the second verification process are passed, the processor will enter the unlocked mode.

14 Claims, 3 Drawing Sheets

WEARABLE DEVICE AND CONTROL METHOD THEREOF

CROSS REFERENCE TO RELATED APPLICATIONS

This application claims priority of Taiwan Patent Application No. 112140117 filed on Oct. 20, 2023, the entirety of which is incorporated by reference herein.

BACKGROUND OF THE INVENTION

Field of the Invention

The invention relates to a wearable device, and more particularly, to a wearable device for providing dual verifications.

Description of the Related Art

In the field of VR (Virtual Reality) or AR (Augmented Reality), the relevant wearable device should be communicated with and connected to other computing devices. However, general connections may have troubles in security issues. Accordingly, there is a need to propose a novel solution for solving the problems of the prior art.

BRIEF SUMMARY OF THE INVENTION

In an exemplary embodiment, the invention is directed to a wearable device interacting with a computing device. The wearable device includes a fingerprint identification module, a pressure sense module, a verification chip, and a processor. The fingerprint identification module receives a fingerprint signal. The fingerprint identification module performs a first verification process on the fingerprint signal. The pressure sense module receives a touch signal. The pressure sense module generates a pending signal according to the touch signal. The verification chip performs a second verification process on the pending signal. The processor is coupled to the fingerprint identification module and the verification chip. The processor is selectively operated in a locked mode or an unlocked mode. If both the first verification process and the second verification process are passed, the processor will enter the unlocked mode.

In some embodiments, the wearable device is implemented with an HMD (Head-Mounted Display).

In some embodiments, the computing device is implemented with a smartphone or a smart watch.

In some embodiments, the wearable device further includes a multi-axis sensor. If the multi-axis sensor detects that the wearable device is moved, the multi-axis sensor will notify the fingerprint identification module, such that the fingerprint identification module can prepare to perform the first verification process.

In some embodiments, the touch signal is relative to a finger pressing event or a finger sliding event.

In some embodiments, the wearable device further includes a wireless communication module for communicating with the computing device.

In some embodiments, in response to the pending signal, the verification chip and a corresponding verification chip of the computing device perform a handshaking process.

In some embodiments, after a confirmation signal is received from the computing device, the verification chip determines that the second verification process is passed.

In some embodiments, only when the handshaking process is successful, the computing device transmits the confirmation signal to the wearable device.

In some embodiments, the wearable device further includes an HBC (Human Body Communication) module configured to receive the confirmation signal from the computing device. The confirmation signal is an HBC signal.

In another exemplary embodiment, the invention is directed to a control method that includes the steps of: providing a wearable device, wherein the wearable device at least includes a fingerprint identification module, a pressure sense module, and a verification chip; performing a first verification process on a fingerprint signal via the fingerprint identification module; generating a pending signal according to a touch signal via the pressure sense module; performing a second verification process on the pending signal via the verification chip; determining whether both the first verification process and the second verification process are passed; if so, controlling the wearable device to enter an unlocked mode; and if not, controlling the wearable device to enter a locked mode.

In some embodiments, the control method further includes: determining whether the wearable device is moved via a multi-axis sensor of the wearable device.

In some embodiments, the control method further includes: if it is determined that the wearable device is moved, notifying the fingerprint identification module via the multi-axis sensor, such that the fingerprint identification module prepares to perform the first verification process.

In some embodiments, the control method further includes: communicating with a computing device via a wireless communication module of the wearable device.

In some embodiments, the control method further includes: in response to the pending signal, performing a handshaking process via the verification chip and a corresponding verification chip of the computing device.

In some embodiments, the control method further includes: after a confirmation signal is received from the computing device, determining that the second verification process is passed via the verification chip.

In some embodiments, the control method further includes: only when the handshaking process is successful, transmitting the confirmation signal to the wearable device via the computing device.

In some embodiments, the control method further includes: receiving the confirmation signal from the computing device via an HBC module of the wearable device. The confirmation signal is an HBC signal.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
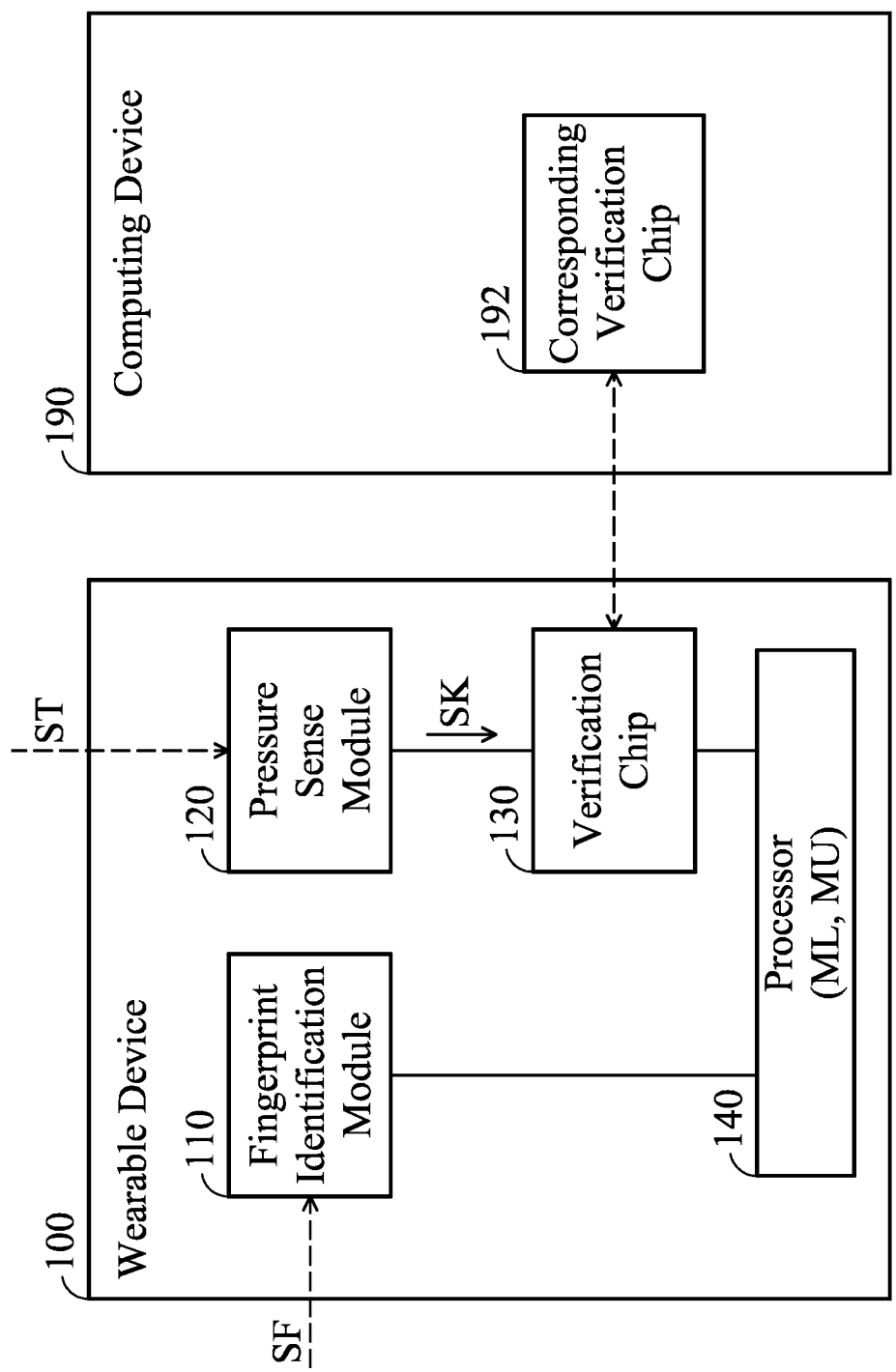
FIG. 1 is a diagram of a wearable device and a computing device according to an embodiment of the invention.

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a wearable device 100 and a computing device 190 according to an embodiment of the invention. The wearable device 100 can interact with the computing device 190. For example, the wearable device 100 may be implemented with an HMD (Head-Mounted Display) or a pair of AR glasses, and the computing device 190 may be implemented with a smartphone or a smart watch, but they are not limited thereto. In the embodiment of FIG. 1, the wearable device 100 includes a fingerprint identification module 110, a pressure sense module 120, a verification chip 130, and a processor 140. Also, the computing device 190 includes a corresponding verification chip 192. It should be understood that any of the wearable device 100 and the computing device 190 may further include other components, such as a housing, a touch control module, a speaker, a display device, and/or a power supply module, although they are not displayed in FIG. 1.

The fingerprint identification module 110 can receive a fingerprint signal SF. The fingerprint identification module 110 can also perform a first verification process on the fingerprint signal SF. For example, when a finger of a user touches the fingerprint identification module 110, the fingerprint identification module 110 may collect the relative fingerprint signal SF. In some embodiments, the fingerprint identification module 110 previously stores a correct fingerprint data. Then, the fingerprint identification module 110 compares the fingerprint signal SF with the correct fingerprint data. If the fingerprint signal SF matches the correct fingerprint data, the fingerprint identification module 110 will determine that the first verification process is passed. Conversely, if the fingerprint signal SF does not match the correct fingerprint data, the fingerprint identification module 110 will determine that the first verification process is unpassed.

The pressure sense module 120 can receive a touch signal ST. The pressure sense module 120 can also generate a pending signal SK according to the touch signal ST. The pending signal SK may record the detailed information of the touch signal ST. For example, the touch signal ST may be relative to a finger pressing event or a finger sliding event. In some embodiments, the pressure sense module 120 includes at least one metal sense strip, and the metal sense strip is disposed on an outer frame (not shown) of the wearable device 100, but it is not limited thereto. In addition, the finger pressing event or the finger sliding event as mentioned above may be triggered by the user's finger touching or sliding on the metal sense strip of the pressure sense module 120.

The verification chip 130 is coupled to the pressure sense module 120. The verification chip 130 can perform a second verification process on the pending signal SK, and can also determine whether the second verification process is passed or unpassed. It should be understood that the implementation of the second verification process is not limited, but the second verification process is different from the first verification process as mentioned above. In some embodiments, the verification chip 130 of the wearable device 100 is connected to the corresponding verification chip 192 of the computing device 190 in a wireless or wired way. For example, the second verification process may be performed by the verification chip 130 independently. Alternatively, the second verification process may be performed by the verification chip 130 and the corresponding verification chip 192 together, but it is not limited thereto.

The processor 140 is respectively coupled to the fingerprint identification module 110 and the verification chip 130, so as to receive the relative information of the first verification process and the second verification process. The processor 140 can be selectively operated in a locked mode ML or an unlocked mode MU. The two operational modes may correspond to different operational states of the wearable device 100, respectively. For example, in the locked mode ML, the user cannot access any data in the wearable device 100. Conversely, in the unlocked mode MU, the user can normally operate the wearable device 100 and access its data. In some embodiments, the processor 140 is initially operated in the locked mode ML. If both the first verification process and the second verification process are passed, the processor 140 can leave the locked mode ML and enter the unlocked mode MU.

With the design of the invention, if it is desired to unlock the wearable device 100, at least two different verification processes should be passed. Therefore, the whole security of the wearable device 100 can be significantly increased. In addition, when the user puts on the wearable device 100, he/she can easily operate the pressure sense module 120 by using the finger(s) without visual assistance. This can also improve the convenience of usage of the wearable device 100.

The following embodiments will introduce different configurations and detail the structural features of the wearable device 100. It should be understood that these figures and descriptions are merely exemplary, rather than limitations of the invention.

Figure 2:
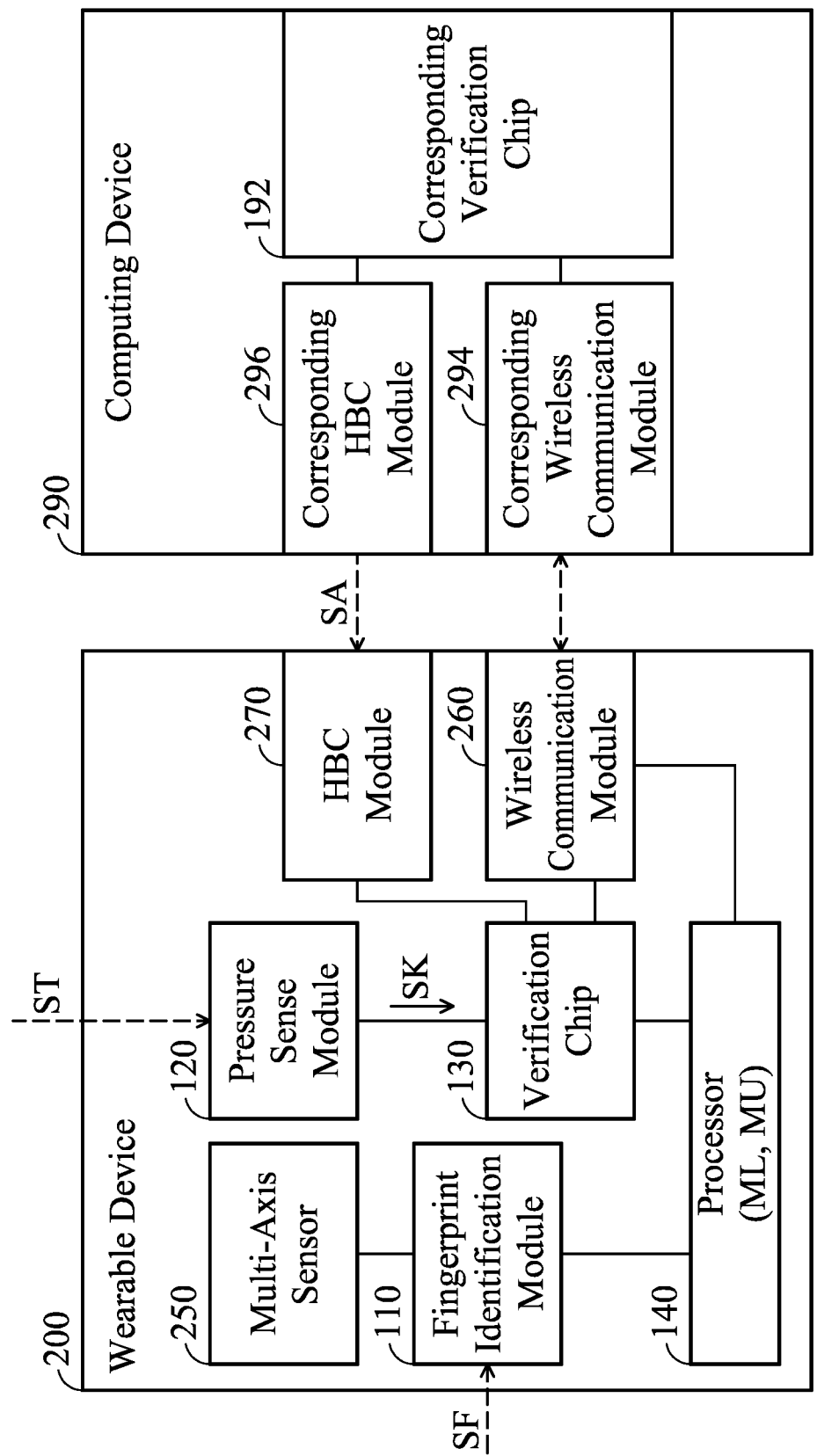
FIG. 2 is a diagram of a wearable device and a computing device according to another embodiment of the invention.

FIG. 2 is a diagram of a wearable device 200 and a computing device 290 according to another embodiment of the invention. FIG. 2 is similar to FIG. 1. In the embodiment of FIG. 2, the wearable device 200 further includes a multi-axis sensor 250, a wireless communication module 260, and an HBC (Human Body Communication) module 270. Also, the computing device 290 further includes a corresponding wireless communication module 294 and a corresponding HBC module 296.

The multi-axis sensor 250 is coupled to the fingerprint identification module 110. The multi-axis sensor 250 can measure an acceleration of the wearable device 200, and can determine whether the wearable device 200 is moved according to the acceleration. If the multi-axis sensor 250 detects that the wearable device 200 is moved, the multi-axis sensor 250 will notify the fingerprint identification module 110, such that the fingerprint identification module 110 can prepare to perform the first verification process. For example, after the user picks up the wearable device 200 from a desktop, in response to the notification of the multi-axis sensor 250, the fingerprint identification module 110 can receive the fingerprint signal SF from the user and then perform the first verification process.

In the wearable device 200, the wireless communication module 260 is coupled to the verification chip 130 and the processor 140. In the computing device 290, the corresponding wireless communication module 294 is coupled to the corresponding verification chip 192. The wireless communication module 260 of the wearable device 200 can communicate with the corresponding wireless communication module 294 of the computing device 290. For example, each of the wireless communication module 260 and the corresponding wireless communication module 294 may be a Bluetooth module or a Wi-Fi module, but it is not limited thereto. In some embodiments, after the first verification process is passed and the pressure sense module 120 generates the pending signal SK, the wireless communication module 260 notifies the corresponding wireless communication module 294, such that the computing device 290 helps to prepare the following second verification process.

In the wearable device 200, the HBC module 270 is coupled to the verification chip 130. In the computing device 290, the corresponding HBC module 296 is coupled to the corresponding verification chip 192. The HBC module 270 of the wearable device 200 can communicate with the corresponding HBC module 296 of the computing device 290. In alternative embodiments, after the first verification process is passed and the pressure sense module 120 generates the pending signal SK, the HBC module 270 notifies the corresponding HBC module 296, such that the computing device 290 helps to prepare the following second verification process. In other words, by using the wireless communication or the HBC, a variety of data can be easily transmitted between the verification chip 130 of the wearable device 200 and the corresponding verification chip 192 of the computing device 290, but they are not limited thereto.

After the first verification process is passed and the user's finger touches the pressure sense module 120, in response to the pending signal SK, the verification chip 130 of the wearable device 200 and the corresponding verification chip 192 of the computing device 290 can perform a handshaking process. The corresponding verification chip 192 of the computing device 290 can store a default event, such as a twice finger-sliding event. If the pending signal SK indicates that the user's finger has slidden on the pressure sense module 120 twice, the aforementioned handshaking process will be successful. Conversely, if the pending signal SK indicates that the user's finger has slidden on the pressure sense module 120 only once, the aforementioned handshaking process will be failed, but it is not limited thereto. It should be understood that such a default event is merely exemplary, which is adjustable according to different requirements.

Only when the aforementioned handshaking process is successful, the corresponding verification chip 192 of the computing device 290 transmits a confirmation signal SA to the verification chip 130 of the wearable device 200. In other words, the HBC module 270 of the wearable device 200 is configured to receive the confirmation signal SA from the corresponding HBC module 296 of the computing device 290. The confirmation signal SA may be an HBC signal. In addition, after the confirmation signal SA is received from the computing device 290, the verification chip 130 of the wearable device 200 can determine that the second verification process is passed. Conversely, if no confirmation signal is received (e.g., exceeding a predetermined time), the verification chip 130 of the wearable device 200 can determine that the second verification process is unpassed. Next, since both the first verification process and the second verification process are passed, the processor 140 of the wearable device 200 can leave the locked mode ML and then enter the unlocked mode MU.

It should be noted that because the confirmation signal SA is an HBC signal, the confirmation signal SA cannot be suddenly leaked, thereby improving the security of the verification process. In addition, if the human body is used as a medium for signal propagation, both the signal attenuation and the noise interference thereof are relatively small, which help to reduce the whole power consumption of the wearable device 200.

Figure 3:
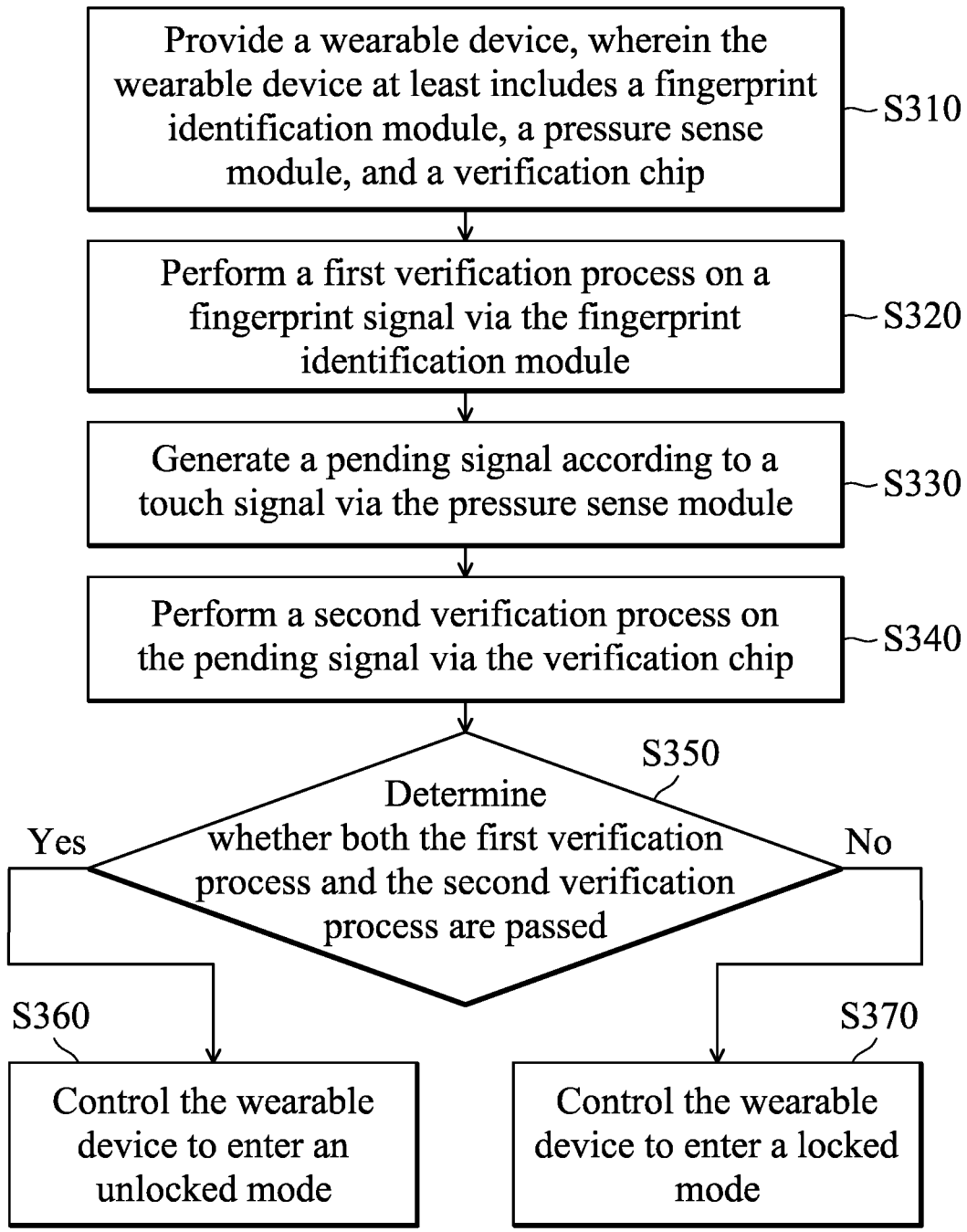
FIG. 3 is a flowchart of a control method according to an embodiment of the invention.

FIG. 3 is a flowchart of a control method according to an embodiment of the invention. To begin, in step S310, a wearable device is provided. The wearable device at least includes a fingerprint identification module, a pressure sense module, and a verification chip. In step S320, a first verification process is performed on a fingerprint signal by the fingerprint identification module. In step S330, a pending signal is generated according to a touch signal by the pressure sense module. In step S340, a second verification process is performed on the pending signal by the verification chip. In step S350, whether both the first verification process and the second verification process are passed is determined. If so (i.e., both the first verification process and the second verification process are passed), in step S360, the wearable device will be controlled to enter an unlocked mode. If not (i.e., at least one of the first verification process and the second verification process is unpassed), in step S370, the wearable device will be controlled to enter a locked mode. It should be understood that these steps are not required to be performed in order, and every feature of the embodiments of FIGS. 1 and 2 may be applied to the control method of FIG. 3.

The invention proposed a novel wearable device and a novel control method. In comparison to the conventional design, the invention has at least the advantages of providing dual verifications, improving the whole security, and reducing the overall power consumption. Therefore, the invention is suitable for application in a variety of devices.

Note that the above element parameters are not limitations of the invention. A designer can fine-tune these setting values according to different requirements. It should be understood that the wearable device and the control method of the invention are not limited to the configurations of FIGS. 1-3. The invention may include any one or more features of any one or more embodiments of FIGS. 1-3. In other words, not all of the features displayed in the figures should be implemented in the wearable device and the control method of the invention.

The method of the invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A wearable device interacting with a computing device, comprising:
    a fingerprint identification module, receiving a fingerprint signal, wherein the fingerprint identification module performs a first verification process on the fingerprint signal;
    a pressure sense module, receiving a touch signal, wherein the pressure sense module generates a pending signal according to the touch signal;
    a verification chip, performing a second verification process on the pending signal; and
    a processor, coupled to the fingerprint identification module and the verification chip, wherein the processor is selectively operated in a locked mode or an unlocked mode;
    wherein if both the first verification process and the second verification process are passed, the processor enters the unlocked mode;
    wherein in response to the pending signal, the verification chip and a corresponding verification chip of the computing device perform a handshaking process;
    wherein after a confirmation signal is received from the computing device, the verification chip determines that the second verification process is passed;
    further comprising: an HBC (Human Body Communication) module, configured to receive the confirmation signal from the computing device, wherein the confirmation signal is an HBC signal.

2. The wearable device as claimed in claim 1, wherein the wearable device is implemented with an HMD (Head-Mounted Display).

3. The wearable device as claimed in claim 1, wherein the computing device is implemented with a smartphone or a smart watch.

4. The wearable device as claimed in claim 1, further comprising:
    a multi-axis sensor, wherein if the multi-axis sensor detects that the wearable device is moved, the multi-axis sensor notifies the fingerprint identification module, such that the fingerprint identification module prepares to perform the first verification process.

5. The wearable device as claimed in claim 1, wherein the touch signal is relative to a finger pressing event or a finger sliding event.

6. The wearable device as claimed in claim 1, further comprising:
    a wireless communication module, communicating with the computing device.

7. The wearable device as claimed in claim 1, wherein only when the handshaking process is successful, the computing device transmits the confirmation signal to the wearable device.

8. A control method, comprising the steps of:
    providing a wearable device, wherein the wearable device at least comprises a fingerprint identification module, a pressure sense module, and a verification chip;
    performing a first verification process on a fingerprint signal via the fingerprint identification module;
    generating a pending signal according to a touch signal via the pressure sense module;
    performing a second verification process on the pending signal via the verification chip;
    determining whether both the first verification process and the second verification process are passed;
    if so, controlling the wearable device to enter an unlocked mode; and
    if not, controlling the wearable device to enter a locked mode;
    further comprising:
    in response to the pending signal, performing a handshaking process via the verification chip and a corresponding verification chip of the computing device,
    further comprising:
    after a confirmation signal is received from the computing device, determining that the second verification process is passed via the verification chip,
    further comprising:
    receiving the confirmation signal from the computing device via an HBC (Human Body Communication) module of the wearable device, wherein the confirmation signal is an HBC signal.

9. The control method as claimed in claim 8, wherein the wearable device is implemented with an HMD.

10. The control method as claimed in claim 8, further comprising:
    determining whether the wearable device is moved via a multi-axis sensor of the wearable device.

11. The control method as claimed in claim 10, further comprising:
- if it is determined that the wearable device is moved, notifying the fingerprint identification module via the multi-axis sensor, such that the fingerprint identification module prepares to perform the first verification process.

12. The control method as claimed in claim 8, wherein the touch signal is relative to a finger pressing event or a finger sliding event.

13. The control method as claimed in claim 8, further comprising:
- communicating with a computing device via a wireless communication module of the wearable device.

14. The control method as claimed in claim 8, further comprising:
- only when the handshaking process is successful, transmitting the confirmation signal to the wearable device via the computing device.

* * * * *